United States Patent [19]
Hetz

[11] Patent Number: 5,566,235
[45] Date of Patent: Oct. 15, 1996

[54] CUSTOMER CONTROLLED SERVICE MEDIATION MANAGEMENT

[75] Inventor: Harry A. Hetz, Silver Spring, Md.

[73] Assignee: Bell Atlantic Network Services, Inc., Arlington, Va.

[21] Appl. No.: 539,639

[22] Filed: Oct. 5, 1995

[51] Int. Cl.$^6$ .................................................. H04M 7/00
[52] U.S. Cl. .......................... 379/201; 379/207; 379/220; 379/221; 379/88; 379/112; 379/113; 379/211; 379/219; 379/212
[58] Field of Search .................................. 379/201, 207, 379/212, 221, 220, 230, 67, 88, 89, 94, 58, 113, 112, 222, 219, 211

[56] References Cited

U.S. PATENT DOCUMENTS

| | | | |
|---|---|---|---|
| 4,191,860 | 3/1980 | Weber . | |
| 4,611,094 | 9/1986 | Asmuth . | |
| 4,611,096 | 9/1986 | Asmuth . | |
| 4,737,983 | 4/1988 | Frauenthal | 379/221 |
| 4,757,267 | 7/1988 | Riskin | 379/113 |
| 4,788,718 | 11/1988 | McNabb | 379/113 |
| 4,827,500 | 5/1989 | Binkerd et al. | 379/88 |
| 4,924,510 | 5/1990 | Le | 379/221 |
| 4,987,587 | 1/1991 | Jolissaint | 379/94 |
| 5,136,636 | 8/1992 | Wegrzynowicz | 379/207 |
| 5,247,571 | 9/1993 | Kay et al. | 379/207 |
| 5,311,572 | 5/1994 | Friedes et al. | 379/67 |
| 5,353,331 | 10/1994 | Emery et al. | 379/58 |
| 5,386,467 | 1/1995 | Ahmad | 379/220 |
| 5,430,719 | 7/1995 | Weisser, Jr. | 379/95 |
| 5,448,632 | 9/1995 | Iyob et al. | 379/201 |
| 5,452,350 | 9/1995 | Reynolds | 379/220 |
| 5,473,679 | 12/1995 | La Porta | 379/220 |
| 5,481,603 | 1/1996 | Gutierrez | 379/220 |

*Primary Examiner*—Jeffery Hofsass
*Assistant Examiner*—Thomas F. Presson
*Attorney, Agent, or Firm*—Lowe, Price, LeBlanc & Becker

[57] ABSTRACT

Equal access to the trigger functionality of the Advanced Intelligent Network (AIN) is accessible to a plurality of service providers offering independent communication services. In response to a trigger event during processing of a call, a switching office sends a query to a mediation point. In the preferred embodiment, the switching office is a telephone office, and the mediation point is an Integrated Service Control Point (ISCP) of a local exchange carrier AIN telephone network. The ISCP may access its own internal data to determine how to process the call, if the call meets certain criteria. Under other criteria, the ISCP acting as a mediator communicates with an alternate carrier's remote database via the common channel interoffice signaling (CCIS) network to obtain one or more instructions as to how to process the particular call. The ISCP validates the instructions from the remote database to insure compatibility with the switches or other equipment of the local network. If valid, the ISCP transmits the instruction to the switching office, which uses information in the instruction to process the call.

32 Claims, 3 Drawing Sheets

CUSTOMER CONTROLLED SERVICE MEDIATION MANAGEMENT

TECHNICAL FIELD

The present invention relates to an Advanced Intelligent Network, which enables third party service providers to utilize trigger points in call processing to initiate query and response procedures with their own databases on an equal access basis.

ACRONYMS

The written description uses a large number of acronyms to refer to various services and system components. Although generally known, use of several of these acronyms is not strictly standardized in the art. For purposes of this discussion, acronyms therefore will be defined as follows:

Action Control Point (ACP)
Advanced Intelligent Network (AIN)
Call Processing Record (CPR)
Common Channel Inter-office Signalling (CCIS)
Data and Reporting System (DRS)
Dual Tone Multifrequency (DTMF)
Integrated Service Control Point (ISCP)
Intelligent Peripheral (IP)
Multi-Services Application Platform (MSAP)
Office Action Control Point (OSO-ACP)
Personal Communications Service (PCS)
Personal Identification Number (PIN)
Plain Old Telephone Service (POTS)
Point In Call (PIC)
Point of Presence (POP)
Service Control Point (SCP)
Service Creation Environment (SCE)
Service Management System (SMS)
Service Switching Point (SSP)
Signaling Point (SP)
Signaling System 7 (SS7)
Signaling Transfer Point (STP)
Transaction Capabilities Applications Protocol (TCAP)

BACKGROUND ART

In recent years, a number of new service features have been provided by an enhanced telephone network, sometimes referred to as an Advanced Intelligent Network (AIN). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signalling (CCIS) link to an Integrated Service Control Point (ISCP) which includes a Multi-Services Application Platform (MSAP) database. If needed, the ISCP can instruct the central office to obtain and forward additional information. Once sufficient information about the call has reached the ISCP, the ISCP accesses its stored data tables in the MSAP database to translate the received message data into a call control message and returns the call control message to the office of the network via CCIS link. The network offices then use the call control message to complete the particular call.

An AIN type network for providing an Area Wide Centrex service was disclosed and described in detail in commonly assigned U.S. Pat. No. 5,247,571 to Kay et al., the disclosure of which is entirely incorporated herein by reference. AIN type processing in such a system is controlled by the ISCP, which typically is operated by the local exchange carrier.

Similar intelligent services, particularly advanced 800 number services, may be offered by other carriers using call processing methodologies similar to those used in AIN. Existing 800 number call processing utilizes a central 800 database in a Service Control Point (SCP), to control switching operations through multiple end offices. Local and/or toll offices of the network detect dialing of an 800 number, suspend call processing, compile a call data message and forward that message via a common channel interoffice signalling (CCIS) link to the 800 database in the SCP. The SCP accesses stored data tables identified by the dialed 800 number to translate the received message data into a call control message, including a plain old telephone service (POTS) type destination telephone number. In this system, if the SCP does not currently store the destination number corresponding to a particular 800 number, the SCP will obtain the destination number from a national 800 database referred to as a Service Management System (SMS). The SCP transmits the call control message to the office of the network via CCIS link, and the network offices use the POTS destination telephone number in the call control message to complete the particular call. Examples of 800 number call processing routines are disclosed in U.S. Pat. No. 4,191,860 to Weber, U.S. Pat. No. 4,611,094 to Asmuth et al. and U.S. Pat. No. 4,611,096 to Asmuth et al.

In AIN services, 800 number call processing and the like, one trigger always results in a query to one database which results in a response message to provide a selected feature as part of a unified service. Even where the network includes multiple databases, the customer cannot obtain independent services from separate providers off the same trigger, e.g. in response to all calls to the subscriber's one number. A number of examples of such unified processing are described in more detail below.

U.S. Pat. No. 5,136,636 to Wegrzynowicz discloses an enhanced 800 number system for selecting a local dealer from among a group of dealers for completion of each 800 number. When a caller dials an 800 number, the call is first connected to an originating screening office action control point (OSO-ACP) 110 of the toll switching system. The OSO-ACP launches a first query to an INWATS (800 number) database. The INWATS database translates the data in the initial query into an initial response message which includes a special routing number, i.e. including a three digit prefix such as 195, which can not be dialed as the first three digits of a valid telephone number. The OSO-ACP recognizes from the prefix digits that an additional query is necessary and launches a second query directed to one of a plurality of direct services dialing databases. The direct services dialing database which receives the second query uses the routing number to access a segment of data within the database to translate the caller's NPA plus office code into the POTS telephone number of a nearby dealer. The direct services dialing database transmits the POTS telephone number back to the OSO-ACP, and the OSO-ACP uses that number to complete the call.

U.S. Pat. No. 4,827,500 to Binkerd et al. discloses a system for providing a call distribution feature on 800 calls in response to either DTMF or speech input commands from the caller, using data from a basic 800 number database and an Advanced 800 number database. When a caller dials an 800 number, the call is routed to an originating screening office which transmits a first query to the 800 number database. If the file in the 800 number database indicates that Advanced 800 number processing in response to DTMF or speech inputs is necessary, the 800 number database returns a message to the originating screening office which includes a destination number corresponding to an Action Control Point (ACP) which is capable of processing the Advanced 800 number calls. The originating screening office switch uses the received number to route the call to the ACP, and in response, the ACP initiates a query message to the Advanced 800 number database asking how to route the present call. The Advanced 800 number database sends a message to the ACP instructing it to route the call to an announcement point, which has a voice processing unit associated therewith. The Advanced 800 number database also sends a message to the announcement point instructing it to play a specific message from the voice processing unit to the present caller and receive tone or speech command signals back from the caller. The voice processing unit derives data from the received signals, and the announcement point forwards that data to the Advanced 800 number database. The database uses the received data, together with the dialed number and the number of the caller, to derive a plain old telephone service type destination number from stored data. The Advanced 800 number database forwards the derived destination number back to the ACP. The ACP drops the connection to the announcement point and requests a connection through the public switched telephone network to the station identified by the destination number.

U.S. Pat. No. 4,924,510 to Le teaches provision of a dynamic table of the most frequently called Advanced 800 numbers and the corresponding routing data in each toll switching system. When a toll switching system receives an 800 call, the table is examined to see if the Advanced 800 service assessing data is stored. If so, the toll switching system accesses the Advanced 800 database directly without first accessing a Basic 800 database. If the data for accessing the Advanced 800 service is not stored in the toll switching system's table, the call is processed in a manner similar to that disclosed in the above discussed Binkerd et al. Patent. The toll switching system updates the table if the call was directed to an Advanced 800 customer.

U.S. Pat. No. 4,987,587 to Jolissaint pertains to method and apparatus for providing an 800 number customer an on-site customer-made determination of what further action should be taken in response to a caller dialing the customer's 800 number. The Jolissaint system includes apparatus for receiving from an 800 number network provider's Host Processor information expressive of an occurrence of a caller having dialed a customer's 800 telephone number. The information received by the customer's Host processor includes the dialed number and an identification of the caller's billing telephone number. The system includes an apparatus for determining at a customer's Host processor an action to be taken in response to the dialing of the 800 number. The customer's Hose processor may deny or accept the call or may route the call to an alternate destination, for example based on the caller's identity. The system further includes an apparatus for transmitting information as to what action the customer's host processor determined should be taken back to the network provider's Host Processor. The network provider's Host Processor then disposes of the call in the manner specified by the information from the customer's Host Processor. For example, if the call is to be accepted, the network provider's Host Processor forwards the call to the caller's local Host Processor.

In actual practice, 800 number services of the type discussed above are offered by multiple carriers, including local exchange carriers and interexchange carriers. When the NXX digits of the dialed 800 number identify an 800 number service offered by the local exchange carrier, the local exchange carriers' switch queries an SCP or ISCP operated by the local exchange carrier for the necessary call processing information. However, if the NXX digits of the dialed 800 number identify an 800 number service offered by a different carrier, the call goes to that carrier's point of presence (POP), and the query goes from the POP to that carrier's SCP. As such, there has been limited capability for carriers other than the local exchange carrier to offer intelligent network type services, e.g. only on outgoing calls wherein the caller dialed a specific type number (e.g. an 800 number). In each case, the query always is forwarded to the one database set up to always control processing of the one customer's 800 number calls. The existing call processing systems and methodologies have not provided alternate carriers with equal access to the trigger functionality of the AIN, to offer their own range of intelligent network type services off of the various types of triggers that the local exchange carrier's intelligent network can recognize.

Some patents have suggested access to other database systems and/or ISCPs of other carriers, but these proposals have still provided at most a limited form of access to the AIN trigger functionality and have not permitted a subscriber to utilize multiple provider's services effectively. Two examples are discussed below.

U.S. Pat. No. 5,311,575 to Friedes et al. teaches providing a customer database, essentially as a customer controlled extension of a network database maintained by the network service carrier. During call processing, a switch (ACP) of the public network queries the carrier's database, and if necessary, the carrier's database obtains additional information from the customer's database. Customers having PBX type on-premises equipment communicate with the subscriber database via a separate status data network. All services are provided through one carrier.

Commonly assigned U.S. Pat. No. 5,353,331 to Emery et al. discloses an AIN based system for offering personal communications service (PCS). As the subscriber roams, the wireless handset periodically registers its location through a mobile switch or through a home land line base station, and this information is recorded in the ISCP for use in routing subsequent calls to the handset at its current location. Of particular note here, in a nationwide implementation of such a system, with multiple ISCP databases, the ISCP in a given region serves as a mediation point to obtain necessary information from switches and ISCPs in other regions. When a subscriber registers through a remote region, either automatically or by initiating an outgoing call, the ISCP in that region executes a validation routine with the ISCP in the subscriber's home region, to confirm that the subscriber is valid and obtain data relating to that subscriber's services. Subsequently, when the home region is processing a call to the subscriber's number, the ISCP in that region communicates with the ISCP in the remote region to obtain information needed to route the call to the subscriber's current location. The switching systems in a particular region communicate with only the ISCP in the particular region. One function of the mediating ISCP is to process data from a distant ISCP to insure compatibility thereof with the switching systems in the particular region. The mediation function of the ISCP in the Emery et al. system, however, is still limited to only certain very specific trigger occurrences and provision of a single unified PCS service, albeit across geographic boundaries. The mediation occurs only in response to a need for validation of a roaming subscriber or in response to an incoming call. The distant carriers can not control the trigger responsive communication to provide a variety of different, independent services.

From the above discussion, it becomes clear that the existing systems and call processing functionalities provide alternate carriers at most a limited intelligent routing (using the carrier's own database) in response to only very specific limited triggering type events. Various carriers cannot use the same trigger to provide one subscriber a plurality of independent services. Alternate carriers have no access to most of the triggers used in AIN type processing, such as off-hook, off-hook delayed, etc. Consequently, such carriers can not provide intelligent network type services facilitated by such triggers unless the local exchange carrier first routes the call to a point of presence type switching system of the alternate carrier. Routing the voice call through the local network to an alternate carrier's switch, before triggering CCIS communication with the carrier's database utilizes an excessive amount of voice channel resources, for example if certain calls ultimately can not be completed. Also, such routing may necessitate double switching if the call needs to go back through the same local exchange carrier network to reach a particular destination.

DISCLOSURE OF THE INVENTION

The present invention overcomes the above noted problems by providing systems and call processing methodologies to access control data of multiple providers or carriers based on call related criteria off a single trigger event. The service providers or carriers can populate data in their respective databases to offer totally separate independent services.

Thus, in one aspect, the present invention relates to a method wherein a mediation point controls communication between switching offices and a selected one of the databases. More specifically, in response to a trigger event during processing of a call, a switching office sends a query to the mediation point. The mediation point selects a carrier's database based on some predetermined criteria relating to the call and obtains the necessary instructions for processing the call. At least for situations wherein the provider operating the database is not the service provider operating the switching office, the mediation point will validate the instruction. The mediation point forwards the instruction back to the switching office to facilitate further processing of the call. Instructions obtained in this manner from different databases provide independent services.

In another aspect, the mediation point may select instructions from a database associated therewith, e.g. maintained by the same service provider operating the switching offices and the mediation point, or selectively communicate via the signaling network with one or more remote databases operated by other carriers in the manner discussed above.

In the preferred embodiment, the switching office is a telephone office, and the mediation point is an Integrated Service Control Point (ISCP) of a local exchange carrier AIN telephone network. The ISCP may access its own internal data to determine how to process the call, if the call meets certain criteria. Under other criteria, the ISCP acting as a mediator communicates with an alternate carrier's remote database via the common channel interoffice signaling (CCIS) network to obtain instructions as to how to process the particular call.

The methodology of the present invention can distinguish which of several carriers should control processing of a particular call, off one trigger event, based on a variety of criteria related to the particular call. Specific examples disclosed in detail below distinguish based on time or on certain dialed digit information. The methodology also can apply to any AIN trigger, whether the trigger relates to an outgoing call or an incoming call.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

The present invention provides for independent alternate services, offered by alternate carrier service providers, in response to any one particular AIN trigger. As used herein, independent services are services that are not necessarily related to each other. It should be noted here that a carrier service provider is any entity operating a communication network. Many such networks are public networks, but many large corporations provide at least some of their own carrier services by operating their own communications networks.

In accord with the present invention, occurrence of a trigger causes a query to a mediation point, typically operated by the local exchange carrier. Each of a plurality of carriers operates a central database storing call processing information to control provision of the respective carrier's services independent of any services offered by other carriers. The mediation point identifies the carrier having control of the call under the current set of conditions. The conditions or criteria may relate to time of day, dialed digits, origin of the call etc. The mediation point then obtains call processing information from a database operated by the carrier having control of the call. The mediation point may process the information to insure compatibility with the switch or other network equipment handling the call, and the mediation point forwards the information to the appropriate network element(s) to continue processing of the call.

Figure 1:
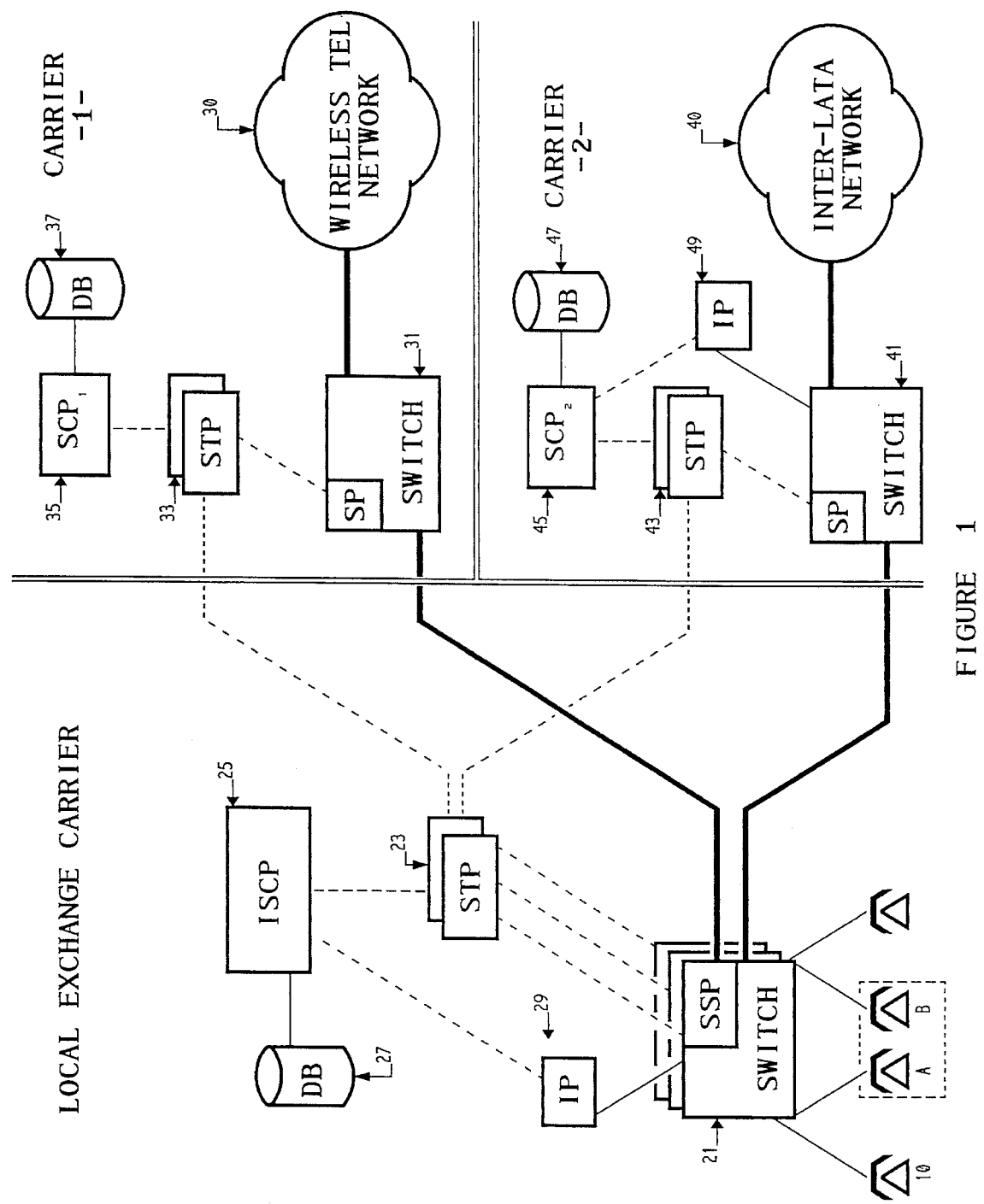
FIG. 1 is a simplified schematic block diagram of an Advanced Intelligent Network utilizing the call processing functionality of the present invention.

Although the routing concepts of the present invention apply to other types of networks, FIG. 1 provides a simplified block diagram of a public telephone type network. For ease of explanation, the succeeding discussion of the invention concentrates on implementation thereof in a telephone network of the type shown in FIG. 1.

Referring to FIG. 1 there is shown a simplified block diagram of a switched traffic network and the common channel signaling network used to control the signaling for the switched traffic network. In the illustrated example, the overall network actually comprises three separate networks operated by three different carriers, a local exchange network, a first alternate network of carrier 1 and a second alternate network of carrier 2.

In the illustrated example, carrier 1 provides a wireless telephone service through network 30, for example similar to that disclosed in the above cited Emery et al. Patent. Carrier 2 operates a network for providing inter-LATA type long distance services. Other carriers could be nearby local exchange carriers, competing local exchange carriers, private networks (e.g. operated by large corporations), etc. Although the signaling message routing of the present invention will apply to other types of networks, in the illustrated example, the various networks all provide telephone type services.

In FIG. 1, the local exchange carrier network includes a number of end office switching systems providing connections to and from local communication lines coupled to end users telephone station sets. The local exchange carrier network typically will also include one or more tandem switching offices (not shown) providing trunk connections between end offices. As such, the first telephone network consists of a series of switching offices interconnected by voice grade trunks. One or more trunks also connect one or more switching offices to at least one switch in the other carriers networks. In the illustrated example, the switch 21 connects via trunk circuits (shown as thick solid lines) to switch 31 in the network of carrier 1 and to switch 41 in the network of carrier 2.

Each switching office, 21, 31, 41 has at least minimal SS7 signaling capability, which is conventionally referred to as a signaling point (SP) in reference to the SS7 network. In the local exchange network, at least the switching office 21 and preferably all of the switching offices are programmed to recognize identified events or points in call (PICs). In response to a PIC, switching office 21 triggers a query through the signaling network to an Integrated Service Control Point (ISCP) 25 for instructions relating to AIN type services. Switching offices such as switch 21 having AIN trigger and query capability are referred to as Service Switching Points (SSPs).

In accord with the present invention, the ISCP 25 serves two functions. First, the ISCP 25 serves as a standard ISCP offering AIN routing control functionalities to customers of the local exchange carrier, in the normal manner. For example, the ISCP includes a database (not shown) containing call processing records (CPRs) for controlling that carrier's AIN routing services. The ISCP 25 may also access a separate database 27, e.g. to supplement its routing tables for certain services. In the present system, the second function of the ISCP is to serve as a mediation point. Specifically, the ISCP mediates queries and responses between the local exchange carrier network components and databases operated by other carriers. The ISCP effectively mediates the other carriers' access to trigger related functionality of the local exchange carrier switches.

The ISCP 25 is an integrated system. Among other system components, the ISCP 25 includes a Service Management System (SMS), a Data and Reporting System (DRS) and the actual database referred to as a Service Control Point (SCP).

The ISCP also typically includes a terminal subsystem referred to as a Service Creation Environment or SCE for programming the database in the SCP for the services subscribed to by each individual business customer. The components of the ISCP are connected by an internal, high-speed data network, such as a token ring network.

The switches 21, 31 and 41 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries.

Within the local exchange network, the common channel interoffice signaling (CCIS) network includes one or more Signaling Transfer Points (STPs) and data links shown as dotted lines between the STP(s) and the switching offices. Typically, STPs are implemented as matching or mated pairs, to provide a high level of redundancy. A data link also connects each of the STPs of pair 23 to the ISCP 25. One or more data links also connect the STPs 23 in the local exchange carrier network to mated pairs of STPs 33, 43 in networks of other carriers.

The local exchange carrier network may also include one or more intelligent peripherals (IPs) 29. The IP provides enhanced announcement and digit collection capabilities and/or speech recognition. The IP connects via an appropriate line circuit to one switch 21 of the local exchange carrier network. The IP communicates with the ISCP 25, through a data communication network separate from the telephone company switching offices and associated interoffice signalling network.

Although shown as telephones in FIG. 1, the terminal devices can comprise any communication device compatible with the local communication line. Where the line is a standard voice grade telephone line, for example, the terminals could include facsimile devices, modems etc. Also, FIG. 1 shows connections to the station via lines, and typically these links are telephone lines. It will be apparent to those skilled in the art that these links may be other types of communication links, such as broadband lines, wireless links, etc.

Commonly assigned copending application Ser. No. 08/248,980, filed May 24, 1994, entitled "Advanced Intelligent Network with Intelligent Peripherals Interfaced to the Integrated Services Control Point" (attorney docket no. 680-076) provides a more detailed disclosure of an AIN type network, including the structure of an SSP switch, the structure of an ISCP and the structure of an IP, and the disclosure of that application is incorporated herein in its entirety by reference.

The networks of carrier 1 and carrier 2 may be similar to each other and in some respects to the network of the local exchange carrier. The network of carrier 1, for example consists of a switch 31, a mated pair of STPs 33, an $SCP_1$ 35 and a database 37. In the illustrated example, the switch 31 provides communications between switch 23 of the local exchange carrier network and the wireless communication network 30. The network of carrier 2, in the example, consists of a switch 41, an IP 49, a mated pair of STPs 43, an $SCP_2$ 45 and a database 47. The switch 41 provides communications between switch 23 of the local exchange carrier network and the inter-LATA long distance network 40.

In the illustrated example, the network of carrier 1 and the network of carrier network 2 are not full AIN type networks. The switching systems do not have full AIN trigger and query capabilities. The network of carrier 1 includes a first Service Control Point (SCP$_1$), and the network of carrier 1 includes a first Service Control Point (SCP$_1$). The routing tables utilized in the SCP type databases typically are more limited than those in the ISCP 17. The switching systems 31, 41 can query the respective SCPs 35, 45 for routing information, but the range of trigger events are more limited.

An end office switching system 21 shown in FIG. 1 normally responds to a service request on a local communication line connected thereto, for example an off-hook from station 10 followed by dialed digit information, to selectively connect the requesting line to another selected local communication line, for example to the line to station A. The connection can be made locally through only the connected end office switching system but typically will go through a number of switching systems.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system, suspends the call and sends a message through the CCIS network to the end office switching system serving the destination telephone line. The terminating end office determines whether or not the called station is busy. If the called station is busy, the terminating end office so informs the originating end office via CCIS message, and the originating end office provides a busy signal to the calling station. If the called station is not busy, the terminating end office so informs the originating end central office. The originating office provides ringback to the caller, and the terminating office applies ringing current to the line to the called party. When the telephone station connected to the called line goes off-hook, the terminating switching office informs the originating switching office, and the two offices establish a telephone connection via the trunks and end offices (and/or tandem offices) of the network between the calling and called stations.

For an AIN type service, such as call redirection based on data stored in the ISCP 25, the end offices and/or tandems are SSP capable and detect one of a number of call processing events, each identified as a 'point in call' (PIC), to trigger AIN type processing. Specifically, in response to such a PIC, a switching system such as switch 21 suspends call processing, compiles a call data message and forwards that message via common channel interoffice signalling (CCIS) links and one or more STPs 23 to an ISCP 25. If needed, the ISCP 25 can instruct the particular switching office to obtain and forward additional information. Once sufficient information has reached the ISCP 25, the ISCP 25 accesses its stored data tables and or data in external database 27 to translate the received data into a call control message and returns the call control message to the switching office via the STP 23 and the appropriate CCIS links. The office uses the call control message to complete the particular call through the public switched network in the manner specified by the subscriber's data file in the ISCP 25.

The SCPs 35, 45 offer similar capabilities in the networks of the other two carriers, but the range of service features offered by those databases are more limited. For example, the SCP 45 may offer 800 number calling services with a limited number of related call routing options. If a caller at station 10 dials an 800 number corresponding to carrier 2, the switch 21 routes the call to switch 41. The switch 41 recognizes the 800 number in the CCIS information provided with the call and launches a CCIS query to the SCP$_2$ 45. The SCP$_2$ 45 translates the dialed 800 number into an actual destination number, for example the telephone number of station A, and transmits a CCIS response message back to switch 41. Switch 41 then routes the call through the public network to the station A identified by the number sent back by the SCP$_2$ 45, using CCIS call routing procedures of the type discussed above. The actual destination line may connect to the exact same office as the calling party's line, as in the above simplified example. However, typically, the destination line connects to a different end office, and the carrier network 2 routes the call to that end office at least partially via the carrier's inter-LATA network 40.

In an actual implementation of the present invention, the network of FIG. 1 would continue to offer a wide range of services using the standard call processing routines common today, including those outlined above. However, the present invention also facilitates providing combinations of services through multiple carrier networks in a unique fashion, as discussed in detail below.

In a call processing operation in accord with the present invention, a switch such as SSP switch 21 reaches a point in call (PIC) in processing a particular call which triggers AIN type processing. A variety of triggers are known including the full range of AIN triggers, virtual numbers (e.g. 500, 800, 900) etc. In response to the PIC trigger, the switch 21 launches a TCAP query through the STP 23 to the ISCP 25. The ISCP 25 accesses the relevant call processing record (CPR) for the subscriber. In accord with the present invention, the CPR will identify a plurality of carriers and/or the carriers' databases, for calls satisfying different predetermined criteria.

The ISCP 25 proceeds to obtain call control or routing information that the switch 21 needs to process the call. If conditions relating to the present call conform to criteria for processing of the call by the local exchange carrier, then the ISCP retrieves a CPR from its own internal SCP database to determine how to process the call and provides an appropriate response message back to the switch 21. If the call meets other criteria, then the ISCP 25 communicates with a selected one of a plurality of other SCPs 35, 45 through the SS7 network. The ISCP 25 may access a separate database 27 to obtain information needed to direct messages through the SS7 network to the appropriate SCP 35 or 45.

The one SCP 35 or 45 contains a call processing record (CPR) for providing the subscriber a customized service on the particular type of call. The subscriber has previously communicated to the carrier how certain calls should be processed, and the carrier's personnel have established the appropriate CPR in the SCP 35 or 45.

The SCP 35 or 45 accesses the CPR to determine how to process the particular call and returns an appropriate instruction, in a TCAP response message, to the ISCP 25. The ISCP 25 performs a mediation function. Specifically, the ISCP 25 processes the instructions from the alternate carrier's SCP 35 or 45 to insure validity and compatibility with the processes of the elements of the local exchanged network that will handle the call. Based on validated instructions, the ISCP formulates an appropriate TCAP response message. The ISCP 25 transmits that messages through SS7 links and one or more STPs 23 to the switch 21 and the switch 21 processes the call accordingly.

A customer can obtain independent services from multiple providers using a single trigger and pre-established selection criteria stored in the ISCP. The present invention effectively provides multiple carriers equal access to the AIN trigger functionalities at various points in call processing, to allow each carrier to independently offer customers special or customized services. A given customer's call may encounter one or more triggers and may receive intelligent services from different carriers, based on a variety of criteria related to each call.

Figure 2:
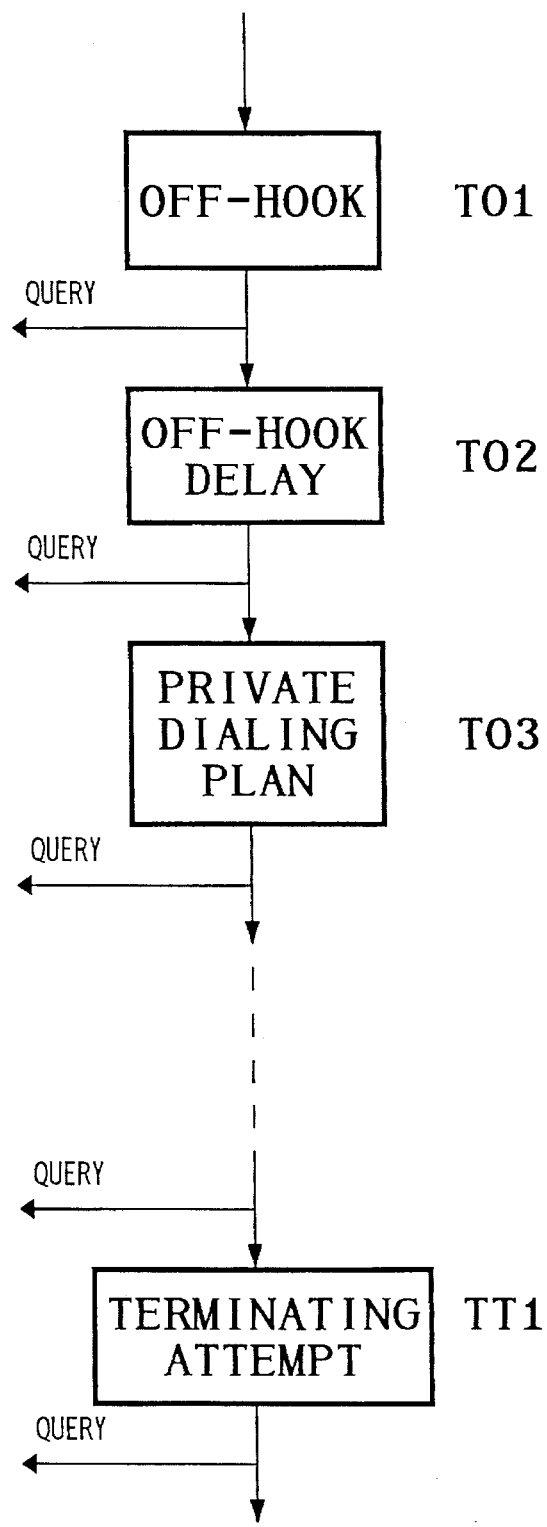
FIG. 2 is a logical diagram useful in explaining the relationship of various AIN triggers.

To further understand the access to trigger functionality, it will be helpful first to consider the relationship between various trigger events. FIG. 2 provides a logical illustration of the relationship between a number of different triggers that may be encountered on any given call.

A number of triggers may be set in an originating office. FIG. 2 shows three such triggers, an off-hook trigger TO1, an off-hook delay trigger TO2 and an individualized dialing plan trigger TO3. Such triggers are set by defining a point in call (PIC) in the subscriber profile for the calling party's line in the switching office serving that line. An off-hook PIC triggers a query immediately whenever a user takes a station off-hook. An off-hook delay PIC triggers a query whenever a station goes off-hook, however, the switch launches the query after collecting dialed digits. An individualized dialing plan PIC triggers a query if a user dials a predetermined or 'plan' number.

As shown by FIG. 2, the triggers have a logical hierarchical relationship. If an off-hook trigger or an off-hook delay trigger is set against a particular line, then the switch launches the query every time that a station on that line goes off-hook. The response to that query controls subsequent processing of the call. By contrast, an individualized dialing plan trigger controls call processing only if the caller dials a particular number, assuming that there was no off-hook trigger already set.

Other triggers are set in the terminating office, such as the terminating attempt trigger TT1 shown in FIG. 2. Such triggers are set by defining a point in call (PIC) in the subscriber profile for the called party in the serving switching office, as identified by that party's telephone number. An outgoing call may produce a trigger in the originating switching office which results in some AIN processing based on the caller's customized service. When the call reaches the terminating office, the call may trigger some processing based on the called party's customized service.

The types of AIN triggers discussed above are exemplary only. A variety of additional triggers are known. Examples of known AIN triggers include: off-hook immediate, off-hook delay, trunk seizure, primary rate interface, individualized dialing plan, office dialing plan, transit network selection, originating line information, directory number, automatic route selection, automatic alternate routing, basic rate interface feature button, terminating attempt and virtual numbers. New triggers are being developed to offer new enhanced AIN services.

All such triggers cause a program controlled switch to initiate a query to a remote database, in an ISCP, SCP or the like. The database responds with information for controlling further processing of the call by the switch and/or other network elements (e.g. IPs). In accord with the present invention, queries from switches in the local exchange carrier network go to an ISCP 25. Based on certain call related criteria and/or the particular type of trigger, the ISCP 25 determines which carrier's database should control each call. The ISCP 25 obtains the data from the identified carrier's database, validates the data if necessary and forwards the data to the switch to control the actual call processing.

In accord with the present invention, different carriers provide services off of the individual triggers. Different carriers may provide different services off the same trigger, but under different conditions (e.g. at different times of day). Also, different carriers may provide different services off different trigger events. For example, a first carrier may provide an outgoing call related service (e.g. extension number dialing, such as disclosed in the above cited Kay et al. Patent) to the calling party based on an individualized dialing plan trigger. Another carrier may provide an incoming call related service to a called party.

Consider now one example of use of the routing functionality of the present invention to provide alternative call forwarding services for one subscriber. Assume now that the customer has opted to forward calls through two alternate carriers' networks during separate times $t_1$ and $t_2$. For example, carrier 1 offers a wireless telephone service, and the subscriber wants calls forwarded via the wireless system during hours when he expects to be on the road or visiting clients, e.g. 11:00 AM to 3:00 PM. Carrier 2 might offer a particularly cost effective voice mail service through its intelligent peripheral (IP) 49, therefore the customer opts to have calls forwarded to the IP of carrier 2 during hours when the business is closed, e.g. 5:00 PM to 9:00 AM weekdays and on weekends. At other times $t_3$ (9:00 AM to 11:00 AM and 3:00 to 5:00 PM on weekdays), the subscriber opts to have the call processed by the local exchange carrier, for direct routing to the office line A or to a secretarial line B associated therewith, if the line to station A is busy or a call is unanswered after a predetermined number of rings.

Call forwarding of the type here under consideration utilizes a termination attempt trigger set in the profile record of the line for the subscriber. In the example, the subscriber utilizes the station A, and the switch 21 provides normal service to that line. The profile record for the line to station A includes the information needed to establish a PIC for a termination attempt trigger against that line.

Figure 3:
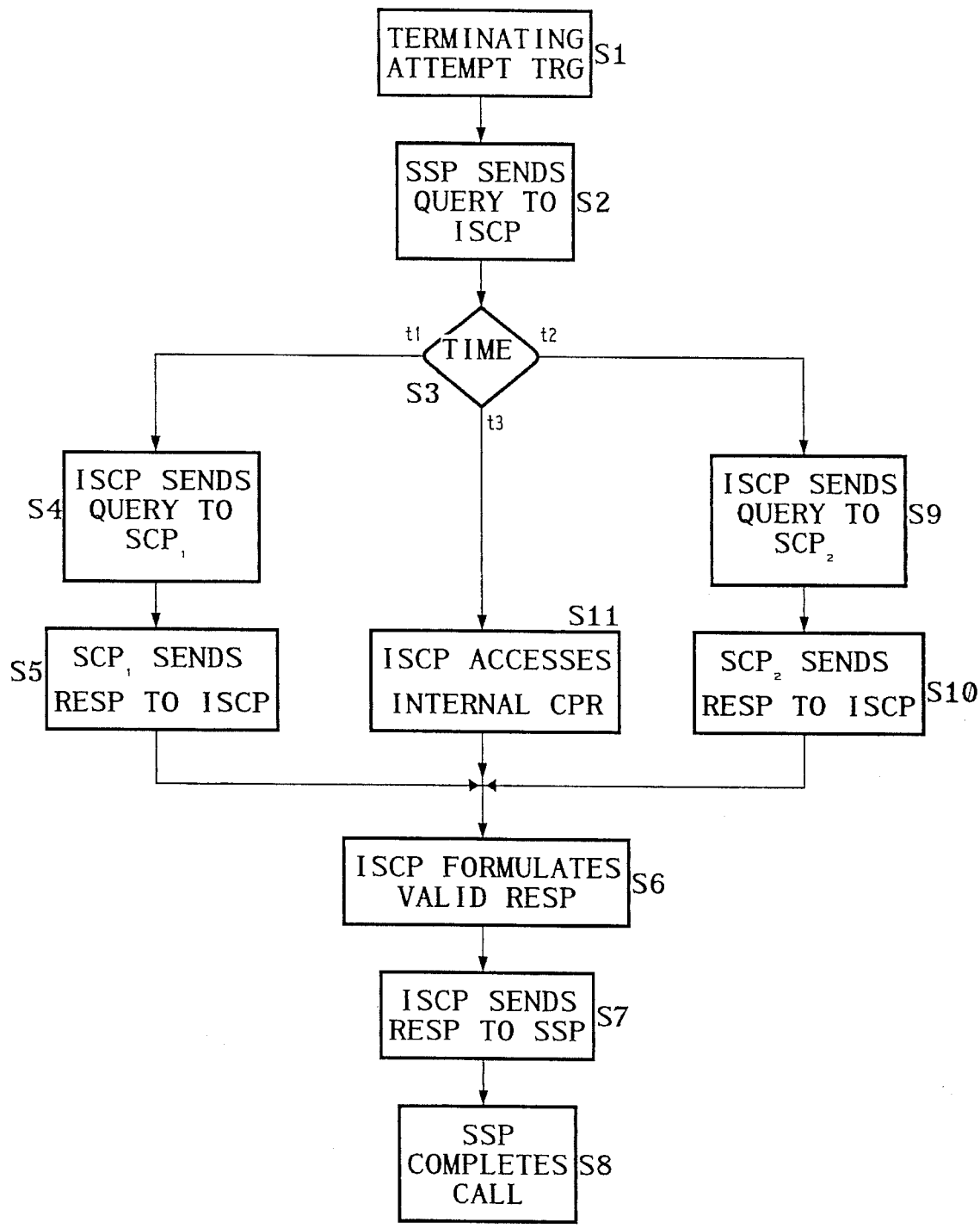
FIG. 3 is a simplified flow diagram of the call processing steps of a group of call forwarding services provided to one customer by multiple carriers, in accord with the present invention.

The call processing flow for this call forwarding example is illustrated in flow chart form in FIG. 3. Assume a caller at station 10 dials the telephone number of station A. The SSP switch 21 detects the termination attempt trigger (S1). In response, the SSP switch 21 formulates a TCAP protocol query message and sends that message through the SS7 network, including one or more STPs 23, to the ISCP 25 operated by the local exchange carrier. In accord with the TCAP protocol, the query includes a variety of information relating to the present call. In particular, the query message includes the digits dialed by the caller at station 1.

In the present example, the ISCP utilizes the dialed digits to access an appropriate call processing record. The record may be within its own internal SCP type database, or the ISCP may access a record in a separate database 27. The record indicates different procedures to be used at different times. The record therefore results in a branching based on time, at step S3. If the call occurs within time $t_1$, the ISCP transmits a TCAP query message through SS7 data links and one or more STPs to the $SCP_1$ of carrier 1 (step S4).

To the $SCP_1$ receiving the query in step S4, the query looks the same as if the query had originated from a switch. The query typically includes called and calling party numbers and other relevant information about the current call. The SS7 protocol address portion of the message includes destination point code information relating to the sending point and the receiving point, that is the ISCP 25 and the $SCP_1$ 35 in this example. The $SCP_1$ processes the query to generate a response containing an appropriate call processing instruction, just as if the query originated from its own network switch 31, but the $SCP_1$ reverses the point code information from the SS7 query to send the response message back to the ISCP 25 (step S5).

As noted, the query to the $SCP_1$ includes information needed by the SCP 35 to access a record and formulate a response. In the present example, the $SCP_1$ uses the dialed digits from the second query to access the customer's record to determine a routing number for forwarding calls through the wireless network to the subscriber's wireless handset. If necessary, the $SCP_1$ 35 may access expanded data records in an external database 37.

The $SCP_1$ 35 formulates a TCAP response message, including the necessary routing number, and transmits that message back through the SS7 links and STP(s) to the ISCP 25 (step S5). The ISCP 25 processes the information from the $SCP_1$ to insure compatibility thereof with the call processing capabilities of the switch 21, for example, to avoid supplying a routing number that would place the switch in a processing loop. Using the validated information, the ISCP 25 formulates a TCAP response message (step S6) and sends that message to the SSP switch 21 via the SS7 links and one or more STPs 23 (S7). The SSP switch 21 utilizes the validated instruction (routing number in the present example) from the response from the ISCP 25 to process the call. In the present case, the switch 21 uses the routing number to complete the call through the switch 31 and the wireless network 30 to the subscriber's wireless handset.

Returning to the branching in step S3, if the call occurs within time $t_2$, the ISCP transmits a TCAP query message through SS7 data links and one or more STPs to the $SCP_2$ of carrier 2. To the $SCP_2$ receiving the query in step S9, the query looks as if it originated from a switch. The destination point code information relating to the sending point and the receiving point now identifies the ISCP 25 and the $SCP_2$ 45. The $SCP_2$ processes the query to generate a response containing an appropriate call processing instruction, just as if the query originated from its own network switch 41, but the $SCP_2$ reverses the point code information from the SS7 query to send the response message back to the ISCP 25 (step S10).

Again the query includes information needed by the SCP 45 to access a record and formulate a response. In the present example, the $SCP_2$ uses the dialed digits from the second query to access the customer's record to determine a routing number for forwarding calls through that carrier's network to the customer's mailbox in the IP 49. If necessary, the $SCP_2$ 45 may access expanded data records in an external database 47.

The SCP2 45 formulates a TCAP response message, including the necessary routing number, and transmits that message back through the SS7 links and STP(s) to the ISCP 25 (step S10). At approximately the same time, the $SCP_2$ provides an instruction to the IP 49 indicating that the next incoming call to the routing number relates to a call to the mailbox for the particular customer.

The ISCP 25 processes the information from the $SCP_2$ to insure compatibility thereof with the call processing capabilities of the switch 21, exactly as was done for routing information from the $SCP_1$. Using the validated information, the ISCP 25 formulates a TCAP response message (S6) and sends that message to the SSP switch 21 via the SS7 links and one or more STPs 23 (S7). The SSP switch 21 utilizes the validated instruction (routing number in the present example) from the response from the ISCP 25 to route the call. In the present case, the switch 21 routes the call through the switch 41 of carrier 2 to the IP 49. The IP 49 processes the call as a call to the particular subscriber's mailbox, e.g. by playing the subscriber's personalized greeting and recording a subsequent incoming message.

Returning again to the branching in step S3, if the call occurs within time $t_3$, then the subscriber has opted to have the local exchange carrier process the call. The ISCP 25 therefore accesses a call processing record (CPR) for the subscriber within the internal SCP database (step S11). The ISCP 25 processes the information from the initial TCAP query sent up in step S2 and the translation information in the subscriber's CPR to identify a destination telephone number, for example the telephone number of station A. The ISCP 25 formulates a TCAP response message containing that number (S6) and sends that message to the SSP switch 21 via the SS7 links and one or more STPs 23 (S7). The SSP switch 21 utilizes the routing number from the response from the ISCP 25 to route the call, in the present case, to route the call to the line to station A. If the subscriber has a call forwarding service, the switch 21 may forward calls to the secretarial station B, if station A is busy or there is no answer on station A within a predetermined number of rings.

As shown by the above call forwarding example, the called subscriber has obtained three different services from three different carriers based on different processing at different times in response to a single trigger. This effectively gives three different carriers equal access to the same termination attempt trigger in the local exchange carrier's switch 21. Although relatively simple services were described, for convenience, each of the carriers can offer the one customer a full array of AIN type features as part of their respective service. For example, the wireless carrier 1 may offer a 'calling party pays' type feature, whereby a caller not included in a predefined list has to agree to pay before that carrier will complete the call to the subscriber's wireless handset. The interexchange carrier may offer a selected call screening or blocking functionality whereby only callers from certain identified stations or having entered a PIN during a connection to the IP 29 are ultimately connected through to the station A.

In the above example, the routing information in each of the alternate carriers databases $SCP_1$, $SCP_2$ resulted in routing through the respective carrier's network and/or to the respective carrier's resources, such as the IP 49. Although this will often be the case, the data in the respective databases can effectuate any desired call processing functionality. For example, because carrier 2 does not have its own IP, the information in $SCP_1$ could route calls requiring announcement and digit collection (e.g. to prompt the caller to agree to pay for air time and other toll charges) to the local exchange carrier's IP 29 without going through any portion of that carrier's voice or traffic network.

Similar alternate routing options following triggering are offered on outgoing calls. For example, the local exchange carrier may offer an area wide centrex service, including an extension number dialing feature on outgoing calls. Such a service might use a individualized dialing plan type trigger. For inter-LATA calls, however, the same customer might use carrier 2. The access to the database $SCP_2$ 45 of carrier 2 might follow an off-hook delay trigger.

In this regard, it may be helpful to consider one outgoing call in somewhat more detail. Assume use of an off-hook delay trigger. Every time a station on the line goes off-hook and the user dials digits, the switch 21 forwards a query containing the dialed digits and the calling party number to the ISCP 25. The data within the ISCP identifies two or more carriers which may provide service off of that trigger for the particular calling party line. For the present example, assume that the local exchange carrier will provide local calling services, a first interexchange carrier provides normal long distance services at a relatively low rate, and a second alternate carrier provides secure long distance services at a higher rate. If the dialed digits indicate a local call, then the ISCP itself formulates a response message instructing switch 21 to complete the local call. If the dialed digits indicate a long distance call, then the ISCP communicates with the first carrier's database to obtain the routing information. If the dialed digits indicate a call requiring high security, e.g. by use of a 700 number prefix, then the ISCP communicates with the second carrier's database to obtain the further instructions. Typically, the security call would be routed to an announcement point for execution of one or more PIN or password entry procedures, and if the caller passed these security checks, the call would be routed through secure elements of the second carrier's network.

The above examples concentrated on relatively simple AIN interactions, i.e. wherein the switch launched an initial query and received back a destination number. Many services involve more complicated processing requiring multiple message exchanges. If the particular call processing requires additional communication with a database, the additional communication goes through the ISCP 25 for mediation. For example, a response message sent back to the SSP switch 21 may instruct that switch to play an announcement and collect digits, e.g. to enter a personal identification number (PIN). After the switch performs this function, the SSP 21 sends another TCAP message through the SS7 network to the ISCP 25. The ISCP again accesses the selected database, either internally or through a query sent via the SS7 network to a remote SCP or other database. The particular database provides further instructions to the ISCP 25, typically the actual destination number, and if necessary the ISCP 25 validates and forwards the instructions to the SSP switch 21.

The above discussion has concentrated on alternate routing through various alternate carrier networks. In many instances, these carriers include the local telephone company and other, alternate public service carriers. Examples include long distance telephone company's cellular telephone company's and local independent telephone company's in adjacent jurisdictions. It will be readily apparent that some of the alternate networks may be operated by private company's for their own benefit. As a result, the local exchange network may be a network of private branch exchanges, or one of the alternate carrier networks may be a private long distance network between a company's remote locations.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A method comprising the steps of:

detecting a predetermined event during processing of a call through one of a plurality of switching offices of a communication network;

sending a first query containing information relating to the call through an interoffice signaling network to a mediation point;

based on predetermined criteria relating to the call, selecting one of a plurality of service providers capable of providing an independent service to process the call and sending a second query containing at least some of the information relating to the call to a database of the selected service provider;

accessing data in the database of the selected service provider in response to the second query to obtain a call processing instruction;

sending a first response containing the call processing instruction from the database of the selected service provider to the mediation point;

processing the first response to validate the call processing instruction;

sending a second response containing the validated call processing instruction via the interoffice signaling network to the one switching office; and processing the call in accord with the validated call processing instruction to provide a service offered by the selected service provider.

2. A method as in claim 1, wherein a first one of the service providers operates a first portion of the communication network, and the database of the first provider contains data relating to one or more services provided via the first portion of the communication network.

3. A method as in claim 2, wherein a second one of the service providers operates a second portion of the communication network, and the database of the second provider contains data relating to one or more services provided via the second portion of the communication network.

4. A method as in claim 3, wherein the mediation point communicates with the database of the selected service provider via the interoffice signaling network.

5. A method as in claim 1, wherein the switching offices are telephone central office switching systems, and the interoffice signaling network is a common channel interoffice signaling system of a telephone network.

6. A method as in claim 1, wherein the step of processing the call comprises routing the call at least in part using network resources operated by the selected service provider.

7. A method as in claim 1, wherein the second query and the first response are communicated via the interoffice signaling network.

8. A method as in claim 1, wherein the predetermined event is an AIN trigger.

9. A method as in claim 1, wherein the predetermined event is a trigger selected from the group consisting of: off-hook immediate, off-hook delay, trunk seizure, primary rate interface, individualized dialing plan, office dialing plan, transit network selection, originating line information, directory number, automatic route selection, automatic alternate routing, basic rate interface feature button, terminating attempt and virtual number.

10. A method comprising the steps of:

detecting a predetermined event during processing of a call through one of a plurality of switching offices of a communication network;

sending a first query containing information relating to the call through an interoffice signaling network to a mediation point;

if a parameter relating to the call meets a first predetermined condition:
  (a) sending a second query containing at least some of the information relating to the call to a database of a service provider offering a first communication service,
  (b) accessing data in the database of the first service provider in response to the second query to obtain a first call processing instruction,
  (c) sending a first response containing the first call processing instruction from the database of the first service provider to the mediation point,
  (d) processing the first response to validate the first call processing instruction,
  (e) sending a second response containing the validated first call processing instruction to the one switching office, and
  (f) processing the call in accord with the validated first call processing instruction to provide a service offered by the first service provider; and if a parameter relating to the call meets a second predetermined condition:
  (1) obtaining a second call processing instruction from a database associated with the mediation point,
  (2) sending a third response containing the second call processing instruction to the one switching office, and
  (3) processing the call in accord with the second call processing instruction to provide a service offered by the second service provider which is independent of the service offered by the first service provider.

11. A method as in claim 10, wherein if a parameter relating to the call meets a third predetermined condition, the method further comprises the steps of:
  (A) obtaining a third call processing instruction from a database of a third service provider offering a communication service independent of the services offered by the first and second providers;
  (B) sending a fourth response containing the third call processing instruction to the one switching office; and
  (C) processing the call in accord with the third call processing instruction to provide the service offered by the third service provider.

12. A method as in claim 11, wherein the step of obtaining a third call processing instruction comprises:
  sending a query containing at least some of the information relating to the call to the database of the third service provider;
  accessing data in the database of the third service provider to obtain the third call processing instruction,
  sending a response containing the third call processing instruction from the database of the third service provider to the mediation point, and validating the third call processing instruction.

13. A method as in claim 10, wherein:
  the first and second predetermined conditions relate to first and second time periods, respectively
  a parameter relating to the call meets a first predetermined condition if the call occurs within the first time period; and
  a parameter relating to the call meets the second predetermined condition if the call occurs within the second time period.

14. A method as in claim 10, wherein the predetermined event is an AIN trigger.

15. A method as in claim 10, wherein the predetermined event is a trigger selected from the group consisting of: off-hook immediate, off-hook delay, trunk seizure, primary rate interface, individualized dialing plan, office dialing plan, transit network selection, originating line information, directory number, automatic route selection, automatic alternate routing, basic rate interface feature button, terminating attempt and virtual number.

16. A communication network, comprising:
  a local exchange carrier network, said local exchange carrier network comprising:
  (A) local communication links,
  (B) a plurality of separately located central office switching systems interconnected via trunk circuits for selectively providing switched call connections between at least two of the local communication links,
  (C) a mediation point, separate from the central office switching systems, and
  (D) a signalling communication system for two-way communications of data messages, said signalling communication system interconnecting the central office switching systems and connecting the central office switching systems to the mediation point; and first and second service control databases at least one of which communicates with the mediation point via the signaling communication system, said first control database containing data defining a first service and said second control database containing data defining a second service independent of the first service, wherein:

the central office switching systems transmit query messages to the mediation point via the signaling network in response to occurrences of predetermined events in processing of calls, in response to each query relating to a particular call, the mediation point obtains and transmits to one of the central office switching systems service control data from the first control database or the second control database depending on whether a parameter relating to the particular call meets a first predetermined criteria or a second predetermined criteria respectively.

17. A network as in claim 16, wherein the mediation point comprises an integrated services control point containing one of the first and second service control databases.

18. A network as in claim 16, wherein:
  the network further comprises an alternate service carrier network coupled to one of the central office switching systems;
  the first service control database communicates with the mediation point via the signaling communication network; and
  the first service control database stores data defining the first service so as to utilize at least a portion of the alternate service carrier network.

19. A network as in claim 18, wherein:
  the network further comprises another alternate service carrier network coupled to one of the central office switching systems;
  the second service control database communicates with the mediation point via the signaling communication network; and
  the second service control database stores data defining the second service so as to utilize at least a portion of said another alternate service carrier network.

20. A network as in claim 18, wherein the second service control database is associated with the mediation point and stores data defining the second service so as to utilize at least a portion of the local exchange carrier network.

21. A network as in claim 20, wherein the mediation point comprises an integrated services control point containing the second service control database.

22. A network as in claim 16, wherein the central office switching systems are telephone central office switches, and the interoffice signaling network is a common channel interoffice signaling network of a telephone network.

23. A network as in claim 22, wherein the local communication links are telephone communication links.

24. A network as in claim 23, wherein the telephone communication links are telephone lines.

25. A network as in claim 16, wherein the alternate service carrier network is an interexchange carrier network.

26. A network as in claim 16, wherein the alternate service carrier network is a wireless communication network.

27. A method comprising the steps of:

- detecting a predetermined event during processing of a call for one subscriber through one of a plurality of switching offices of a communication network;
- sending a first query containing information relating to the call through an interoffice signaling network to a mediation point;
- if a parameter relating to the call meets a first predetermined condition:
  - (a) obtaining a first call processing instruction from a database operated by a first service provider,
  - (b) sending a first response containing the first call processing instruction to the one switching office, and
  - (c) processing the call in accord with the first call processing instruction to provide the subscriber a service offered by the first service provider; and
- if a parameter relating to the call meets a second predetermined condition:
  - (1) obtaining a second call processing instruction from a database operated by a second service provider,
  - (2) sending a second response containing the second call processing instruction to the one switching office, and
  - (3) processing the call in accord with the second call processing instruction to provide the subscriber a service offered by the second service provider which is independent of the service offered by the first service provider.

28. A method as in claim 27, wherein the call for one subscriber is an incoming call to a number assigned to the one subscriber.

29. A method as in claim 28, wherein the predetermined event is an AIN trigger relating to incoming calls.

30. A method as in claim 27, wherein the call for one subscriber is an outgoing call from a communication link assigned to the one subscriber.

31. A method as in claim 30, wherein the predetermined event is an AIN trigger relating to outgoing calls.

32. A method comprising the steps of:

- detecting a predetermined event during processing of a first call for one subscriber through one of a plurality of switching offices of a communication network;
- sending a first query containing information relating to the call through an interoffice signaling network to a mediation point
- determining that a parameter relating to the first call meets a first predetermined condition;
- obtaining a first call processing instruction from a database operated by a first service provider;
- sending a first response containing the first call processing instruction to the one switching office;
- processing the first call in accord with the first call processing instruction to provide the subscriber a service offered by the first service provider;
- detecting a predetermined event during processing of a second call for the one subscriber through one of a plurality of switching offices of a communication network;
- determining that a parameter relating to the second call meets a second predetermined condition;
- obtaining a second call processing instruction from a database operated by a second service provider;
- sending a second response containing the second call processing instruction to the one switching office; and
- processing the second call in accord with the second call processing instruction to provide the subscriber a service offered by the second service provider which is independent of the service offered by the first service provider.

* * * * *